Sept. 15, 1931.  O. H. WURSTER  1,823,813
EXTRACTOR
Original Filed March 26, 1925   2 Sheets-Sheet 1

Sept. 15, 1931.  O. H. WURSTER  1,823,813
EXTRACTOR
Original Filed March 26, 1925    2 Sheets-Sheet 2

INVENTOR
Oscar H. Wurster
BY Nissen & Crane
ATTYS.

Patented Sept. 15, 1931

1,823,813

UNITED STATES PATENT OFFICE

OSCAR H. WURSTER, OF CHICAGO, ILLINOIS

EXTRACTOR

Application filed March 26, 1925, Serial No. 18,364. Renewed April 3, 1930.

This invention relates to a device for extracting fat, oils, or other material from substances in which they are found, such as animal and vegetable products, and has for its object the provision of mechanism which shall be of improved construction and operation and which shall be more efficient, convenient and economical to use than apparatus of a similar nature heretofore manufactured.

The invention is exemplified in the combination and arrangement of parts shown in the accompanying drawings and described in the following specification, and it is more particularly pointed out in the appended claims.

In the drawings—

The present invention comprises an improved extractor of the general nature shown in application, Serial No. 637,713, filed May 9, 1923, in the name of Walter E. Sanger and myself.

Figure 1:
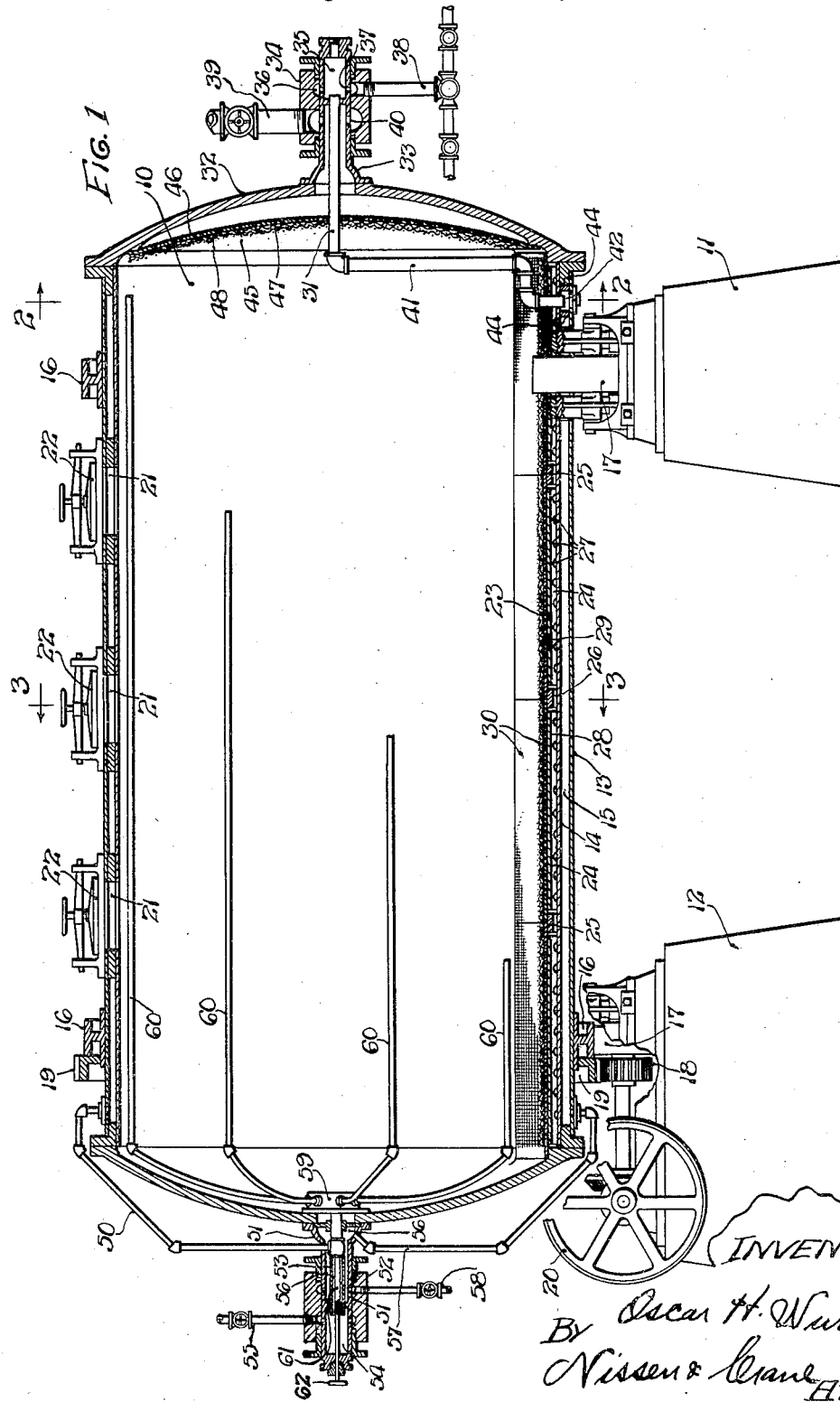
Fig. 1 is a vertical section on the central longitudinal axis of an extractor showing one embodiment of the present invention.
Figure 2:
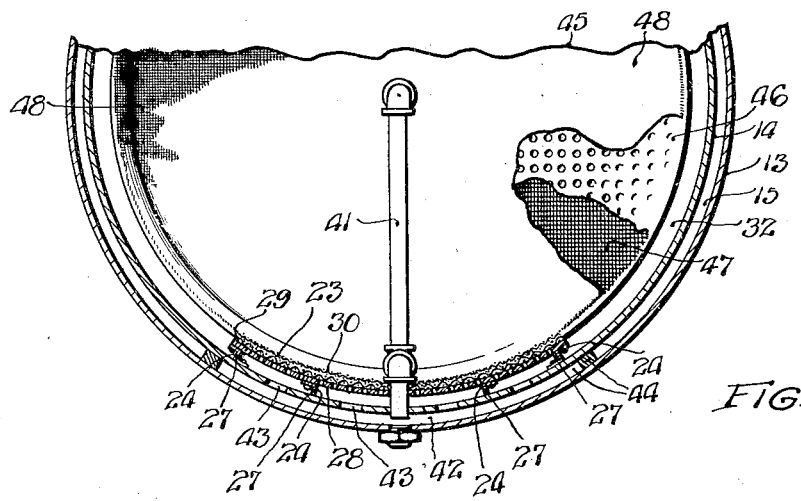
Fig. 2 is a transverse section substantially on line 2—2 of Fig. 1.
Figure 3:
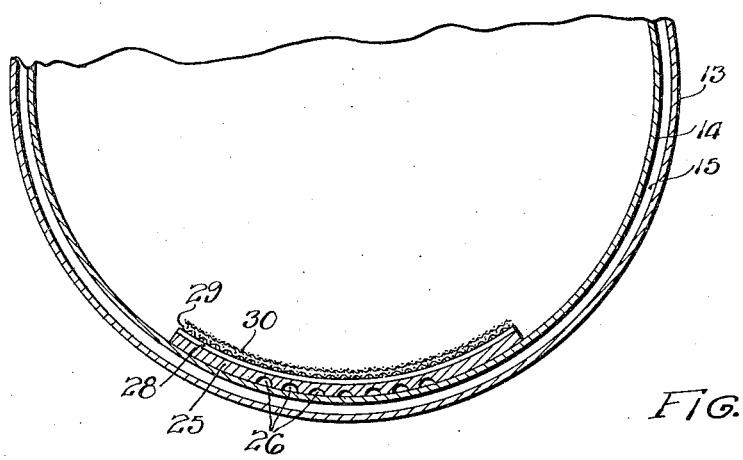
Fig. 3 is a fragmentary transverse section on line 3—3 of Fig. 1.

As shown in Fig. 1, a container or cylindrical tank 10 is supported on base members 11 and 12 and provided with spaced walls 13 and 14 forming a jacket space 15 surrounding the container. A pair of tracks 16 encircle the tank 10 and are arranged to travel on rollers 17 supported on the blocks 11 and 12. This will permit the tank to rotate about its central longitudinal axis. Rotation is imparted to the tank by a pinion 18 which meshes with a gear 19 surrounding the tank adjacent one of the tracks 16. The gear 19 is driven by a pulley belt 20 connected with the gear by suitable shafting. Manholes 21 having covers 22 are provided to permit access to the interior of the tank, but to provide means for tightly closing the tank when desired. A filter bed or strainer 23 is provided adjacent a portion of the inner wall 14 but spaced inwardly from the wall by angle bars 24, as shown in Fig. 2. The filter bed is preferably made in sections and the ends of the section are supported by bars 25 which are curved to conform to the curvature of the wall 14. The bars 25 are provided with transverse openings 26 to permit free flow of liquid along the surface of the wall 14. The angle bars 24 are also provided with transverse openings 27 to permit the liquid to flow circumferentially along the inner surface of the wall 14. The filter bed is preferably made of a plurality of layers of material, the outer layer 28 being sheet metal having perforations therein to permit the passage of liquid therethrough. Sheet steel is suitable for this purpose. A layer of comparatively heavy screen wire 29 may be arranged adjacent the inner face of the plate 28 and finer mesh wire 30 may be disposed on the inner face of the heavy wire 29. The sheet metal outer layer 28 will provide sufficient strength to withstand the pressure resting upon the filter bed while the layers of screen wire will provide a strainer of sufficiently fine mesh to prevent the passage of solid material through the filter bed. It will be noted that the filter bed is curved to substantially conform to the curvature of the inner wall of the tank so that a maximum amount of filtering surface is provided with a minimum amount of space. The filter bed may be extended circumferentially any desired amount and it has been found in practice that one-sixth to one-third of the circumference of the tank gives satisfactory results. The economy of space is very marked over that occupied by a filter arranged on a plane. Where the filter bed is curved it may be spaced substantially uniformly from the wall of the tank so that there is no waste space between the filter and the tank wall. This is especially economical in the distribution of the space within the tank where a filter bed of large area is desired.

The material to be treated is charged into the tank through the manholes 21 and is then flooded with a solvent, such as benzol, carbon tetrachloride, or other suitable substance for dissolving the material to be separated. The solvent may be introduced through a pipe 31 which projects through a central opening in one end 32 of the tank.

A sleeve 33 is connected with the end of the tank 32 and communicates with the opening therethrough. The sleeve 33 is rotatably mounted in a block 34 and is provided with a chamber 35 which communicates with the pipe 31. The block 34 has a circumferential groove 36 which registers with openings 37 through the sleeve 33. A supply pipe 38 communicates with the chamber 35. In this way communication is established between the pipes 38 and 31, which communication is not destroyed by rotation of the tank. A pipe 39 communicates through openings 40 and the sleeve 33 with the interior of the tank 10. The pipe 31 is provided with a laterally projecting arm 41 which extends into a depression or groove 42 communicating with the interior of the tank 10 through openings 43, but separated from the jacket chamber 15 by partition walls 44. The solvent will be discharged from the pipe 41 into the depression 42 from which it will flow into the tank 10 to flood the material with which the tank is filled. The tank may be rotated if desired to thoroughly mix the solvent with the material to be treated and when the solvent is charged with the dissolved material it may be pumped from the tank through the pipes 41 and 38, suitable pumping mechanism, not shown, being employed for this purpose. The solvent is then treated to remove the dissolved material. During the process it may be desirable to draw off water vapor and vapor of the solvent and this is done through the interior of the sleeve 33 and the pipe 39. In order to prevent the solid material within the tank from clogging the open end of the sleeve 33 a filter or screen 45 is provided at the end of the tank 32, but spaced inwardly from the tank wall. This screen preferably consists of a supporting layer of sheet metal 46 similar to the layer 28 of the filter bed. Layers of screen wire 47 and 48 similar to the layers 29 and 30 are disposed upon the supporting base 46. It will be noted that the filter or screen 45 extends well out toward the periphery of the tank so that a portion of the periphery of the screen will extend beyond the solid material to insure sufficient surface for the vapors to pass through the screen. The solvent will ordinarily not extend above the opening in the end of the sleeve 33.

If it is desired to heat the material during the treatment or subsequent to the treatment for the purpose of removing excess solvent, this may be done by introducing steam into the jacket 15 through a pipe 50. The pipe 50 passes through a sleeve 51 which is journaled in a stationary block 52, the inner end of the pipe communicating with a pipe 53 which opens into a chamber 54 in the sleeve 51. Live steam may be introduced into the chamber 54 through a supply pipe 55. A second chamber 56 within the sleeve 51 is connected by a pipe 57 to the jacket 15 at a position spaced from the connection with the pipe 50. A drain pipe 58 also communicates with the chamber 56. By this means water due to condensation of the steam within the jacket 15 may be drawn off. Within the tank 10 there is provided a distribution head 59 having a series of pipes 60 communicating therewith. These pipes 60 discharge at various positions within the tank 10. An inner pipe 61 passes through the center of the pipe 53 is controlled by a valve 62. When the valve is opened live steam will be admitted from the chamber 54 to the pipe 60. This steam may be used to facilitate the operation within the extractor or may be employed for assisting in removing excess solvent after the extracting operation is completed. It will be seen that the arrangement of the parts described leaves practically the entire space within the interior of the tank unobstructed so that there are no projections upon which the material may fall and catch. The pipes 60 are disposed adjacent the periphery of the tank so that the material will not be disposed between these pipes and the walls of the tank. The filter bed is curved to conform to the wall of the tank so that it will occupy a minimum of space leaving the interior of the tank practically unobstructed. The screen 45 at the end of the tank from which the vapor is withdrawn makes it possible to provide an exit for the vapor without the necessity of a projection into the interior of the tank.

I claim:—

1. An extractor comprising a rotary horizontally disposed cylindrical tank, a filter arranged within said tank adjacent a portion of the side wall thereof and curved to follow the curvature of said side wall, and longitudinally extending ribs interposed between said filter and side wall to hold said filter in spaced relation to said side wall, said ribs having transverse openings therethrough to permit circumferential flow of liquid between said filter and side wall.

2. An extractor comprising a horizontally disposed cylindrical tank arranged to rotate about a horizontal longitudinal axis, a filter disposed within said tank adjacent a portion of the side wall thereof, and circumferential and longitudinal spacers interposed between said filter and side wall, said spacers having transverse openings therethrough to permit flow of material between said side wall and filter both longitudinally and circumferentially.

3. An extractor comprising a horizontally disposed cylindrical tank and a filter comprising a plurality of separate sections arranged adjacent a portion of the side wall of said tank, said sections being curved to conform to the curvature of the wall of said tank, said sections having longitudinally extending ribs provided with transverse openings for spacing said sections from said wall, and circumferentially disposed supporting ribs for said sections, said circumferentially disposed ribs having transverse openings therethrough.

4. An extractor comprising a hollow cylindrical tank arranged to rotate about a horizontal axis, a hollow sleeve secured to one end of said tank co-axial with said tank, means for separating the interior of said sleeve into two compartments, an external conduit communicating with one of said compartments, a conduit within said tank also communicating with said compartment and extending to a point adjacent the periphery of said tank to permit liquid to be passed through said conduit from said tank when said tank is in position with said point at the bottom side of said tank, the other compartment of said sleeve being arranged to open into the interior of said tank, and an external conduit communicating with said other compartment for extracting vapor from said tank, said sleeve being rotatable relative to said external conduits while maintaining communication therewith.

5. An extractor comprising a cylindrical tank arranged to rotate about a horizontal axis, said tank having a jacketing chamber in the outer wall thereof, a hollow sleeve secured to one end of said tank and co-axial therewith, means for supplying steam to said sleeve, a conduit connecting the interior of said sleeve with said jacketing chamber, a distributing head disposed within said tank and communicating with the interior of said sleeve, and a valve for controlling the admission of steam from said sleeve to said distributing head.

6. An extractor comprising a cylindrical tank arranged to rotate about a horizontal axis, a hollow sleeve secured to one end of said tank and coaxial therewith, said sleeve having separate compartments therein, the wall of said tank being provided with a jacketing chamber, means for supplying steam to one compartment in said sleeve, means connecting said compartment with said jacketing chamber, means for extracting liquid from another compartment of said sleeve, and a conduit for connecting said other compartment with said jacketing chamber.

7. An extractor comprising a horizontally disposed cylindrical tank provided with a jacketing chamber in the wall thereof, a hollow sleeve connected with one end of said chamber and co-axial therewith, said sleeve having separated compartments therein, a distributing head disposed within said chamber, means for supplying steam to one compartment in said sleeve, means through which liquid may be withdrawn from another compartment in said sleeve, conduits for connecting said steam compartment with said jacket and said distributing head respectively, a valve for controlling the flow of steam from said steam compartment to said distributing head and jacket, and a conduit for connecting the other compartment of said sleeve with said jacket at a point spaced from the point of connection of said jacket with said steam compartment.

8. An extractor comprising a cylindrical tank, means rotatably supporting one end of said tank, a hollow trunnion fixed to the other end of said tank, a bearing within which said trunnion rotates, a head arranged within said tank adjacent one end thereof, a conduit co-axial with said trunnion extending through the end of said tank and communicating with said head, an external conduit extending through said bearing, said hollow trunnion having an orifice registering with said external conduit for supplying fluid to said first-named conduit when said tank is rotated, and discharge pipes disposed within said tank and communicating with said head, said discharge pipes being extended radially from said head adjacent the end of said tank and continued longitudinally of said tank adjacent the outer wall thereof.

9. A rotary extractor comprising a rotary jacketed drum, a filter screen arranged within said drum adjacent a portion of the inner wall thereof, and a spacing means between said filter screen and said wall having longitudinal and circumferential grooves arranged therein some of said grooves being arranged adjacent said screen and others of said grooves being arranged adjacent said wall.

In testimony whereof I have signed my name to this specification on this 24th day of March, A. D. 1925.

OSCAR H. WURSTER.